United States Patent [19]
Kodali

[11] Patent Number: 5,968,222
[45] Date of Patent: Oct. 19, 1999

[54] DUST REDUCTION AGENTS FOR GRANULAR INORGANIC SUBSTANCES

[75] Inventor: Dharma R. Kodali, Plymouth, Minn.

[73] Assignee: Cargill, Incorporated, Minneapolis, Minn.

[21] Appl. No.: 08/796,923

[22] Filed: Feb. 7, 1997

[51] Int. Cl.$^6$ .............................. C05G 5/00; B32B 5/16
[52] U.S. Cl. ................... 71/64.07; 71/33; 71/34; 71/58; 71/61; 427/220; 427/221; 428/403
[58] Field of Search .......................... 71/64.07, 33, 34, 71/58, 61; 427/220, 221; 428/403

[56] References Cited

U.S. PATENT DOCUMENTS

| | | |
|---|---|---|
| 3,264,089 | 8/1966 | Hansen . |
| 3,779,821 | 12/1973 | Fujiki et al. . |
| 4,576,626 | 3/1986 | Bauer et al. . |
| 4,608,203 | 8/1986 | Akasaka et al. . |
| 4,681,617 | 7/1987 | Ghyczy et al. . |
| 4,721,706 | 1/1988 | Bessler et al. . |
| 4,846,871 | 7/1989 | Detroit . |
| 5,041,153 | 8/1991 | Detroit . |
| 5,123,950 | 6/1992 | Homma et al. . |
| 5,328,497 | 7/1994 | Hazlett . |
| 5,383,952 | 1/1995 | Singewald et al. . |
| 5,472,476 | 12/1995 | Schapira et al. . |
| 5,595,782 | 1/1997 | Cole . |
| 5,603,745 | 2/1997 | Pettersen et al. . |
| 5,698,005 | 12/1997 | Schapira et al. . |

FOREIGN PATENT DOCUMENTS

| | | |
|---|---|---|
| 979314 | 12/1975 | Canada . |
| 0 702 999 | 3/1996 | European Pat. Off. . |
| 870264015 | 10/1987 | Japan . |
| 1494480 A1 | 10/1993 | U.S.S.R. . |
| WO96/00199 | 1/1996 | WIPO . |

OTHER PUBLICATIONS

Hackh's *Chemical Dictionary* (Fourth Edition), McGraw–Hill Book Company, p. 543, 1969.

Peplinski et al., Surface Oil Application Effects on Chemical, Physical, and Dry–Milling Properties of Corn, *Cereal Chemistry*, (67):232–236 (1990). (No Month).

Szuhaj, Lecithins: Sources, Manufacture & Uses, The American Oil Chemists' Society, Champaign, Illinois, pp. 16–19, 109–111, 153–155 (1989) (No Month).

*Primary Examiner*—Wayne Langel
*Attorney, Agent, or Firm*—Merchant & Gould P.C.

[57] ABSTRACT

A coated granular inorganic substance and a method for producing the coated substance are provided. The coated granular inorganic substance includes inorganic particles having outer surfaces at least partially coated with an organic layer which includes a phosphorus-containing, amphiphilic component. A coating composition which includes a phosphorus-containing, amphiphilic component and a fertilizer spreader containing fertilizer particles having outer surfaces substantially coated with an organic layer which includes the phosphorus-containing, amphiphilic component are also provided.

26 Claims, 7 Drawing Sheets

The effectiveness of Various Anti-Dusting Agents(@2000ppm) on Potash

DUST REDUCTION AGENTS FOR GRANULAR INORGANIC SUBSTANCES

BACKGROUND OF THE INVENTION

Inorganic substances and more specifically, fertilizers, such as ammonium phosphates, calcium phosphates, ammonium nitrates, potassium nitrates, potassium chlorides, potassium sulfates, etc., are widely used. Methods of manufacturing these inorganic materials, as well as methods of processing the materials into particles via prill and granulation techniques, are also known. The resulting particulate materials, however, often exhibit an undesirable level of dust formation and/or caking. When handled or transported, the granular particles can easily break into smaller particles, resulting in a substantial amount of dust. Additionally, granular inorganic particles, such as fertilizers, often tend to cake when stored and transported in bulk, resulting in substantial amounts of the initial free flowing particulates agglomerating into larger solid masses.

Dust emission is a problem creating a growing concern about atmospheric pollution and its possible ecological and toxicological effects. For example, while it is preferable to produce non-dusty fertilizer particles, special antidust treatments are often applied, due to the difficulty in manufacturing useable particulate fertilizer that does not emit dust.

Dust consists of airborne particles the majority of which are about 10 micron size or smaller created during the production and handling of fertilizers and other inorganic particulates. Depending upon the type of substrate, simple remediations like aspiration and water spray may be applied. To reduce the dust on fertilizer, a petroleum residue or hydrogenated mineral oil is typically sprayed onto the fertilizer. The application of the anti-dusting agent occurs generally during the drying of the phosphate granules in the tumbler. This facilitates the complete coverage of the coating onto the fertilizer particle surface.

Until this time, treatment of inorganic particulates, such as fertilizers, has focused on petroleum-based products, mineral oils, and waxes. There are disadvantages involved in such treatment methods. Oils tend to volatilize and/or soak into the fertilizer with time and lose their effectiveness, while waxes and petroleum-based products are difficult to handle, and can require special heated application equipment. Inorganic particulates coated with petroleum-based products can generate residues on handling equipment, and, in the case of coated fertilizers, typically result in the separation of scum upon dissolution of the fertilizer in water. Other dust treatment methods involve application of an aqueous lignosulfonate solution, other liquid fertilizers, or water to the fertilizer particles. While liquid treatment compositions, such as these, may reduce the fertilizer dust levels, the liquid compositions coated on the fertilizer particles tend to promote caking of the granular fertilizer particles.

A number of conditioning agents have been applied to fertilizers during processing in an attempt to harden and implant anti-caking and anti-dusting properties to fertilizer particles. For example, anti-caking properties have been imparted to fertilizer particles by utilizing clay, talc, surfactants, or a combination of these three conditioners, to coat the particles. Additionally, various oils have been sprayed on fertilizer particles for controlling dust. A phosphoric acid-boric acid compound has also been utilized in phosphate production as a hardening agent. Urea and other fertilizers have also been treated with lignosulfonates alone, or in combination with a co-additive, such as molasses.

SUMMARY OF THE INVENTION

Herein there is provided a coated granular inorganic substance which includes inorganic particles whose outer surfaces are at least partially coated with an organic layer. The outer organic layer includes an amphiphilic material. The amphiphilic material typically includes a phosphorus-containing, amphiphilic component, such as a phospholipid. For the purposes of this application, a phosphorus-containing, amphiphilic component is defined as a compound that includes a lipophilic organic tail portion and a phosphorus-containing, "hydrophilic" polar head portion. Suitable phosphorus-containing polar head groups include partial esters of phosphoric acid or a phosphonic acid, such as found in phospholipids like phosphatidylcholine, or an N-acyl phosphatidylethanolamine.

"Inorganic" as used herein refers to materials that do not contain carbon based compounds or ions, i.e., compounds or ions that lack a carbon atom, except that carbon dioxide, carbon monoxide and carbonic acid and its salts with a non-carbon caontaining cation are consideredd to be inorganic compounds for the purposes of this application. The inorganic particles are typically formed from one or more inorganic salt compounds. The term "salt" as used herein refers to ionic compounds formed by replacing at least one acidic hydrogen of an inorganic acid with a cation of an inorganic base. In a preferred embodiment of the invention, the coated granular inorganic substance is a coated fertilizer.

The present invention also provides a method of at least partially coating the outer surfaces of granular inorganic particles with an organic layer including an amphiphilic component. The method includes applying a coating agent, including the amphiphilic component, to the particles. The coating agent may be applied by a wide variety of methods, including spraying the coating agent over the particles, or simply mixing the coating agent with the particles, such as in a roller mill.

The coating agents employed in the present method typically include an amphiphilic component, such as a phospholipid or a mixture of phospholipids, and lipophilic diluent component. The diluent includes one or more compounds having at least one lipid-like group (i.e., a saturated or unsaturated hydrocarbon straight chain having at least eight carbon atoms) in the molecule. Preferably the coating agent contains a limited amount of water, typically no more than about 10 wt. % and, more preferably, no more than about 5 wt. %. Increasing the amount of water in the present coating composition tends to increase the viscosity of the composition. It is believed that this is due to an increased association of phospholipids in the presence of water. Where the coating composition is to be applied to inorganic particles via spraying, a relatively low viscosity (e.g., no more than about 6,000 cP at 25° C.) is desired and no more than about 3 wt. % and preferably no more than about 1 wt. % water is present in the coating composition.

In a preferred embodiment, the coating agent is formed substantially from non-toxic, biodegradable materials. This provides an environmentally friendly coating which may be produced from renewable resources and reduces potential environmental problems associated with coatings applied to inorganic granules that may be released into the environment.

The present method is particularly useful for producing a coated granular fertilizer having a reduced dust content and/or enhanced dispersability with respect to the corresponding uncoated granular material or to fertilizers coated with either mineral oils or petroleum-based coating agents.

The relative dispersability of a granular inorganic material can be determined using a functional laboratory test such as described in U.S. Pat. No. 4,608,203, the disclosure of which is herein incorporated by reference.

The present coated granular fertilizer facilitates the direct application of fertilizer granules to the soil from a fertilizer spreader. The reduced dust content alleviates the environmental problem which can be associated with the direct broadcasting of uncoated fertilizer granules from a spreader. The present coated material also has a reduced propensity to adsorb water and an enhanced flowability with respect to the corresponding uncoated granular material and to fertilizers coated with agents containing sugars (e.g., molasses) or sulfur-containing materials (e.g., lignosulfonates). The enhanced flowability facilitates easier and more uniform broadcasting of the fertilizer onto the soil from the spreader. The propensity to adsorb water ("hygroscopicity") and flowability of a granular inorganic material can be determined using functional laboratory tests such as described in International Patent Application No. WO 96/00199, the disclosure of which is herein incorporated by reference.

DETAILED DESCRIPTION

Figure 1:
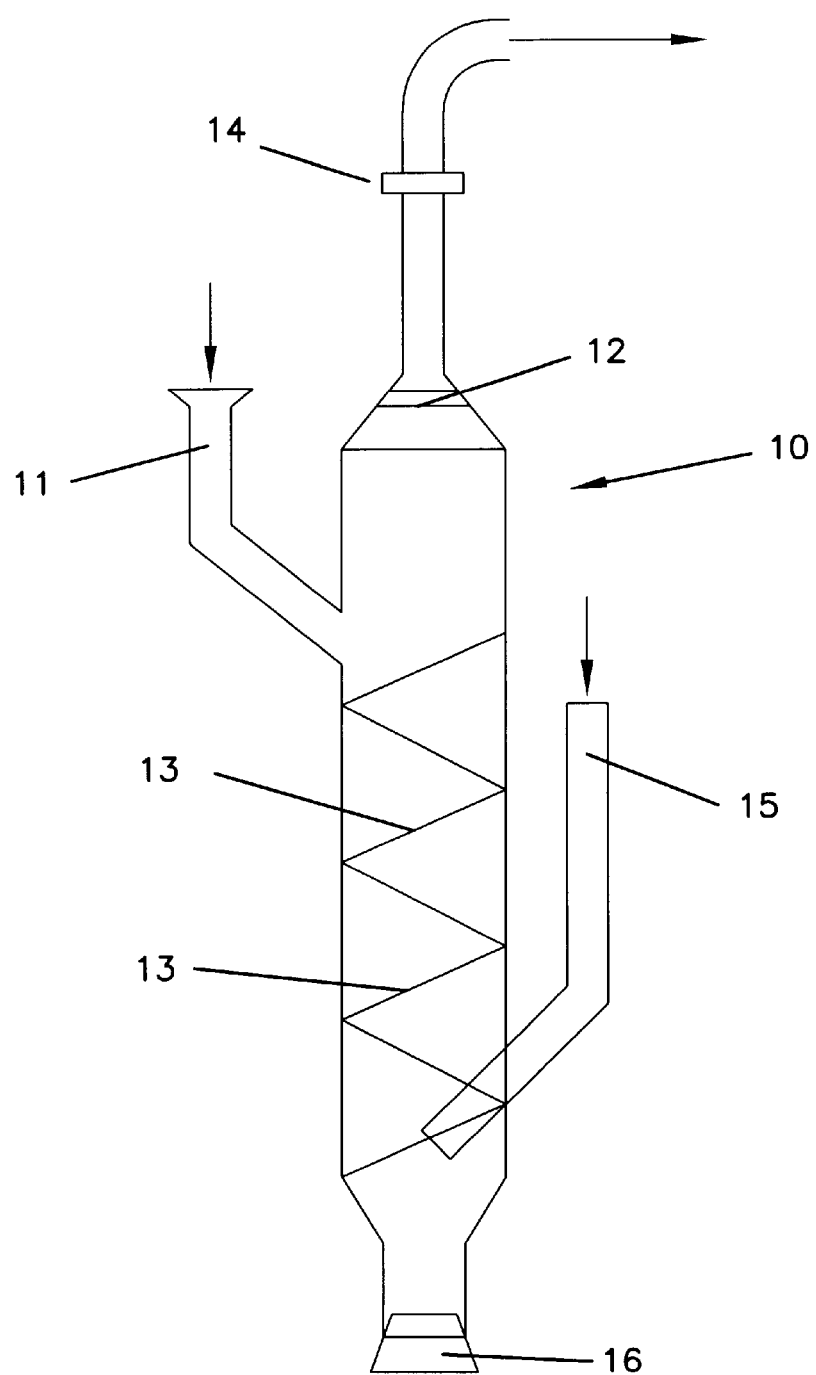
FIG. 1 depicts an apparatus employed in determining the dust content of compositions according to the present invention.
Figure 2:
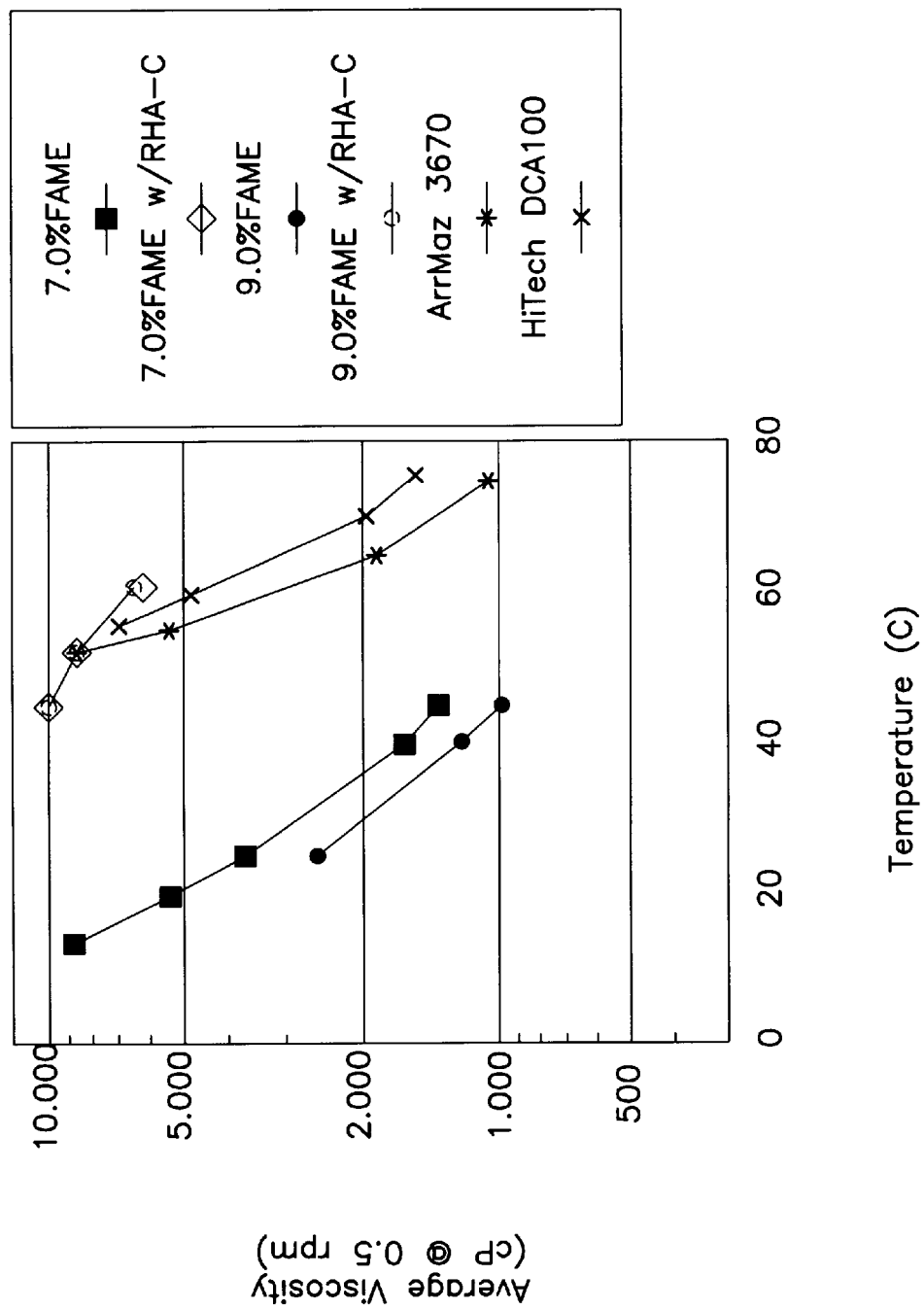
FIG. 2 is a graph showing the effect of temperature on the viscosity of a number of phospholipid-containing compositions according to the present invention. The viscosities of two commercial petroleum-based coating compositions (ArrMaz 3670™ and HiTech DCA 100™) are shown for comparison purposes.

Dust is generated during the production, handling and transportation of fertilizers and other inorganic materials. At present, a petroleum distillate residue (e.g., Dustrol 3079™ or Arr-Maz 3670™) is typically used as the anti-dusting agent with phosphate fertilizers (e.g., MAP, DAP or GTSP). Petroleum-based materials of this type have a relatively high viscosity and must either be heated or diluted with a volatile solvent in order to be coated onto particles. Petroleum distillate residue material produces a sludge that can sometimes clog filters during spray application. Mineral oil (e.g., Paraflex HT 100™) is typically employed as an anti-dusting agent for potash fertilizers. As used herein, the term "potash" is used to refer to any fertilizer containing a potassium salt (e.g., potassium nitrate, potassium chloride or potassium sulfate).

The present invention provides a biodegradable coating agent for inorganic granules which imparts dust control, anti-caking and flow properties comparable to or exceeding those obtainable with current dust control agents used with such particles. The outer organic layer of the present coated inorganic particles includes an amphiphilic component, such as a phospholipid. The core inorganic particle generally includes a granulated form of a fertilizer additive, such as monoammonium phosphate ("MAP"), diammonium phosphate ("DAP"), a trisuperphosphate ("GSTP"), calcium phosphate, ammonium nitrate, potassium nitrate, potassium chloride or potassium sulfate. In some embodiments of the invention, two or more such fertilizer additives may be blended together during manufacturing to form a mixed fertilizer (e.g., a blend of diammonium phosphate and potassium nitrate). During manufacturing, granulated fertilizers of this type are typically prilled to form aggregates having a particle size of about 1 mm to about 6 mm.

It is presently believed that the performance of the phospholipid-type materials in the present coating agent may be due to the amphiphilic nature of the molecules. The polar/polar interaction of the phospholipid polar head groups with the polar surface of the granule binds the phospholipid coating layer tightly to the granule surface. The hydrophobic non-polar tails of the phospholipids form the exposed outer layer of the coated granules. The tightly bound amphiphilic coating increases the integrity of the granules and decreases friction during the handling of the fertilizer, resulting in less dust and improved flow properties with respect to uncoated granules. The modified surface of the fertilizer also minimizes the inter-particle interactive forces that could lead to caking, which can be a severe problem during prolonged storage under high humidity. It is presently believed that the organic coating layer traps moisture inherently present in the particle thereby preventing migration of the moisture to the particle surface and minimizing moisture initiated interactions which can lead to caking.

Phospholipids, which are readily available from a wide variety of plant, animal or microbial sources, are a group of lipid compounds which yield, on hydrolysis, phosphoric acid, an alcohol, a fatty acid, and a nitrogenous base. Phospholipids are widely distributed in nature and include such compounds as phosphatidyl choline, phosphatidyl ethanolamine (sometimes referred to as "cephalin"), and inositol phosphatides as well as lysophospholipids (phospholipids having only a single lipophilic tail group). For commercial purposes, phospholipids are typically derived from a number of animal and vegetable sources, with a common source being crude soybean oil. The phospholipid fraction derived from vegetable oils is commonly referred to as lecithin.

Similar materials are available from animal or microbial sources. Phospholipids are generally solid compounds which do not melt, but instead degrade and char when heated to a temperature above about 140° C. Since they contain both hydrophilic and lipophilic segments, the phospholipids are widely used as emulsifying, dispersing, and wetting agents. In addition, the phospholipids are very resistant to hydrolytic and oxidative rancidity, and have been used commercially as anti-oxidants.

For reasons relating to cost and commercial availability, lecithin derived from plant sources is one preferred source of phospholipids material for use in the present compositions. For the purposes of this application, "lecithin" is defined to encompass crude and purified mixtures of phosphatidyl esters and/or phosphatidic acids having a composition similar to the mixtures of neutral and polar lipids obtained as a by-product in the refining of vegetable oils. In addition to at least 50 wt. % acetone-insoluble phosphatides, lecithin typically includes various amounts of triglycerides, fatty acids and carbohydrates. The term "lecithin" as used herein is not limited to phospholipids from any specific source nor is it meant to refer specifically to phosphatidylcholine. Examples of lecithins suitable for use in the present invention include lecithins derived from soybean, cotton seed, corn, canola, sunflower, linseed, peanut, palm, and palm kernel.

One source of phospholipids is commercial soybean lecithin (also referred to as natural lecithin or whole lecithin) which is a by-product from the refining of soybean oil. Crude soybean oil from a commercial solvent extraction process generally contains about 1.0 to about 3.0 weight percent phospholipids. When the crude oil is refined, the first step normally is to remove the phospholipids. This step, often called "degumming," is accomplished by first adding water to the crude oil. The water hydrates the phospholipids and makes them less soluble in the oil. The denser phospholipids and water are then separated from the less dense oil in centrifuges. The removal of the water from the dense phase results in a product having approximately equal amounts of phosphatidyl choline, phosphatidyl ethanolamine, and inositol phosphatides. Partially refined soybean oil is commonly added back to produce a liquid product that is flowable at room temperature (sometimes called "fluidized lecithin"). Commercial fluid soybean lecithin contains about 50 to 65 wt. % phospholipids and a small amount (generally less than about 5 weight percent) of various carbohydrates, mineral salts, protein materials, free fatty acids, sterols, and water. The remainder of commercial soybean lecithin is soybean oil.

The present coating compositions may also be prepared using powdered lecithin as a phosphlipid source. Powdered lecithin is typically produced by acetone extraction of a crude lecithin gum fraction obtained in soybean oil processing. The acetone extraction removes a large amount of non-phosphorus containing materials and produces a material having greater than 90 wt. % phospholipid. Prior to use as a coating agent in the present invention, the powdered lecithin is generally fluidized by addition of a lipophilic diluent such as vegetable oil(s), mineral oil(s), fatty acid(s) and/or fatty acid ester(s).

Another commercial source of phospholipids is the class of products resulting from the modification of soybean lecithin to improve its hydrophilic properties. Various approaches have been taken to carry out the modification. For example, one approach has been to chemically or enzymatically modify ordinary soybean lecithin, e.g., via reaction with maleic anhydride or acetic anhydride. Lecithins, other phospholipid preparations, or individual phospholipids purified from natural sources or obtained by chemical synthesis, contain one or more functional groups susceptible to chemical modifications, e.g., carbon-carbon double bond(s), ester(s), phosphonate ester(s), amine(s) and carboxyl group(s). Chemical modification of phospholipids can be compatible with the present methods. Thus, phospholipids that have been acetylated, hydroxylated, hydrolyzed, hydrogenated, halogenated, phosphorylated, sulfated epoxidated, ethoxylated, or otherwise modified are potentially useful in the present methods and are included within the meaning of the term "phospholipid" as used herein. Various natural and synthetic phospholipids may be obtained commercially, for example from CALBIOCHEM®, La Jolla, Calif., USA and SIGMA® Chemical Company, St. Louis, Mo., USA.

A second approach has been to remove certain components from the lecithin, e.g. by extraction with acetone to produce a lecithin having >90 wt. % phospholipid. Yet a third approach has been to add certain components to lecithin, such as the homogeneous blend of unmodified soybean lecithin and one or more nonionic emulsifiers, such as polyoxyalkylene monoglyceride, polyoxyalkylene diglycerides, and polyoxyethylene derivatives of sorbitan partial fatty acid esters.

The present coated particles can be produced by a method that includes applying a coating composition that includes a phosphorus-containing, amphiphilic component to the inorganic particles. A sufficient amount of the coating composition is applied to the particles to reduce the amount of dust associated with the particles relative to uncoated particles. The coating composition is typically applied in a manner that results in the particles being substantially coated (i.e., at least about 50% of the surface area of the particles) with an organic layer that includes the phosphorus-containing, amphiphilic component. Preferably the organic layer is applied to at least about 75% and, more preferably, at least about 90% of the surface area of the particles. This may be accomplished by spraying the coating composition over the particles or by simply mixing the coating composition with the particles, e.g., by introducing the coating composition to particles being tumbled in a roller mill. The application of the coating composition may advantageously be carried out during the process of drying granules, e.g., in a heated roller mill.

The coating compositions employed in the present method typically have a viscosity of about 100 to about 10,000 cP at 25° C. The viscosities discussed herein can be measured using a Brookfield Model DVII+ Viscometer at 0.5 RPM. Preferred embodiments of the present coating composition which are intended to be sprayed onto phosphate fertilizer particles have a viscosity of about 1,000 to about 6,000 cP at 25° C. Coating agents designed to be used to coat potash fertilizer particles are generally formulated to have an even lower viscosity (e.g., about 1000 cP at 25° C. and 500–800 cP at 40° C.) Coating compositions which have viscosities within these ranges can easily be applied at or close to ambient temperature using conventional equipment. The present coating agents represent a substantial advantage over the petroleum-based coatings typically used to control dust associated with granulated phosphate-containing fertilizers. The petroleum-based coatings are generally applied at elevated temperatures (e.g., at least about 50–60° C.) due to the highly viscous nature of the petroleum-based materials. In addition to enhanced ease of application, the ability of the present coating agents to be coated onto fertilizer granules at or near ambient temperatures (e.g., 20° C. to 40° C.) reduces the potential for environmental problems associated with volatilization of organic components having lower boiling points and decreases energy costs associated with the manufacturing process.

The present coating compositions preferably include a mixture of phospholipids from a readily available source, e.g., lecithin derived from processing of a vegetable oil. In order to attain the viscosity required to facilitate uniform surface treatment of the granules, the lecithin is generally formulated with a diluent. Examples of suitable diluents include hydrophobic organic solvents such as alkanols, alkanes, alkyl acids, and alkyl esters having from 8 to about 30 carbon atoms. The diluent is generally chosen to provide a coating composition having a relatively high flash point (e.g., a flash point of at least about 120° C.) in order to minimize potential fire and explosion hazards during the manufacturing of the coated inorganic particles.

Preferably, the present coating agents include a lipophilic diluent component, such as vegetable oil(s), fatty acid(s), fatty acid ester(s), fatty acid amide(s), fatty alcohol(s) and/or mineral oil(s). Typically, the present coating agents include a mixture of one or more such lipophilic diluents. It has been found that phospholipid-based coating agents which include a lower alkyl (i.e., C1–C6) ester of a fatty acid have excellent dust reduction properties and are extremely easy to coat onto granular fertilizers such as monoammonium phosphate, diammonium phosphate and triammonium superphosphates. Preferably the lower alkyl fatty acid ester is a C1–C4 ester of a C14–C18 fatty acid. Examples of suitable fatty acid ester which may be used as lipophilic diluents in the present coating agents include methyl and ethyl esters of plant derived fatty acids, e.g., methyl esters of soybean fatty acid (hereinafter referred to as "FAME"). One example of a preferred coating composition of the invention includes a mixture of (a) a fluidized soybean lecithin, which contains phospholipids, soybean oil and a minor amount of soybean fatty acids (e.g., sufficient fatty acids to give the fluidized lecithin an acid value of about 15 to about 35) and (b) about 5–20 wt. % (based on the total composition weight) soybean fatty acid methyl esters.

The present coating compositions include a sufficient amount of the phosphorus-containing amphiphilic material to provide a amphiphilic layer on the predominant portions of the outer surfaces of an inorganic particle being coated. Preferably, the coating compositions include at least about 25 wt. %, more preferably at least about 50 wt. % and most preferably about 60 to about 80 wt. % of a phosphoslipid. The phospholipid typically includes at least about 50 wt. % of phosphatidyl choline, phosphatidyl ethanol amine, phosphatidyl serine, phosphatidyl glycerol, phosphatidyl inositol, an N-acyl phosphatidyl amine or a mixture thereof.

Excellent dust control of granular fertilizers (e.g., phosphate fertilizers) has been obtained by coating the granular particles with coating agents which include at least about 25 wt. % of a phospholipid, about 3 to about 40 wt. % of a lipophilic diluent, and no more than about 20 wt. % water. Preferably, such coating agents include at least about 50 wt. % of a phospholipid, about 5 to about 20 wt. % fatty acid methyl esters and no more than about 5 wt. % and, preferably, no more than about 3 wt. % water.

The performance characteristics of the present coating agent allows excellent dust reduction and caking prevention to be achieved using relatively small amounts of the coating. For instance, excellent dust control can be achieved by coating fertilizer particles with about 0.01 to about 2.0 wt. %, and preferably about 0.1 to about 0.5 wt. % (based on the total weight of the coated fertilizer particles) of the present phospholipid-based coating agents. As a specific example, a greater than 50% reduction in dust content of MAP, DAP, GTSP or potash can be realized by coating fertilizer particles, at least 90% of which have a particle size of about 1 mm to about 6 mm, with no more than about 0.5 wt. % of the coating agent.

Under some circumstances, it may be preferable to produce a fertilizer composition having a somewhat darkened color, e.g., sort of a brown/black color. This can be achieved by adding a highly colored additive to the coating composition. There are a number of colored additives which can be added to the present coating compositions to darken their color. Many uncoated inorganic materials, as well as granular, inorganic fertilizer materials are light-medium gray or brown in color. Even after coating materials with a phospholipid-based coating agent, many fertilizers still have a gray color. A darkened outer organic layer can be produced on fertilizer or other inorganic granulates by coating the particles with a phospholipid formulated with rice hull ash, charred rice hull ash, powdered carbon, an organic dye, or a colored inorganic powder (e.g., iron oxide).

Alternatively, fertilizer particles already coated with the present phospholipid coating agent may be darkened simply by heating the coated particles, e.g., from about 1 to about 60 minutes at a temperature of about 110° C. to about 150° C. For example, MAP, DAP and GTSP coated with a about 0.2 to about 0.5 wt. % soybean lecithin can be darkened simply by heating the coated fertilizer granules.

In order to more precisely control the degree of darkening of the coating agent, it may be advantageous to alter the color of the coloring agent before its application to the inorganic particles. For instance, during the isolation of phospholipid fraction from soybean oil, the gum fraction is typically subjected to heat and vacuum in order to remove water. The phospholipid containing-material may be darkened at this stage by heating the gum fraction for a longer period of time and/or at a higher temperature. The degree of darkening of the coating material is perhaps more easily controlled by heating the formulation produced after sufficient lipophilic diluent has been added to the phospholipid material to achieve the desired coating agent viscosity. For example, lecithin containing 5–20 wt. % FAME can be darkened sufficiently by heating the material for about one to about sixty minutes at a temperature of about 110° C. to about 150° C. Preferably, such a coating agent is darkened by heating at 135–145° C. for about one to about twenty minutes. For certain applications of the present coating agents, it is useful to monitor the darkening of the color and control the heating to produce a phospholipid-based coating agent having dark brownish black color and a Gardener color of greater than 18.

The coating agent is typically applied to a granular inorganic fertilizer as part of the process of manufacturing the granules. For example, during a typical manufacturing process to produce a granular inorganic fertilizer such as GTSP, a super saturated liquid slurry of GTSP is granulated into wet granules which are fed into a drying tumbler. This can be carried out using either a batch or continuous processing mode, although a continuous process is preferred for the manufacture of large commercial scale quantities of coated granular fertilizer (e.g., the production of at least about one ton of granulated fertilizer per day). The coating agent is typically added to the fertilizer granules in the drying tumbler where the uniform application of the coating material is ensured by the thorough mixing/rotating action in the tumbler. The coating agent may be simply added as discreet aliquot at defined time intervals or, more preferably, may be continuously sprayed onto the granules. The latter method typically provides a more uniform distribution of the coating agent on the granules and allows the addition of the coating agent to be carried out prior to introduction of the granules into the tumbler. Preferably, however, the coating agent is sprayed onto particles in the tumbler which have already been at least partially dried. If a coated granules having a darkened color are desired, the granules are held in the tumbler at a sufficiently high temperature for a sufficient time to achieve the degree of darkening desired. For example, maintaining the coated particles in the tumbler at about 135–145° C. for about 15–25 minutes is generally sufficient to produce coated fertilizer granules having a color similar to that obtained by coating the granules with a commercial petroleum-based coating such as Dustrol The invention will be further described by reference to the following examples. These examples illustrate but do not limit the scope of the invention that has been set forth herein. Variation within the concepts of the invention will be apparent.

EXAMPLES

Example 1

Dust Content Determination

The 4" diameter dust tower 10 shown in FIG. 1 was used measuring the dust content of particulate materials. The dust filter 12 (3M #7258 Easi-Air R Dust/Mist Prefilter) was pre-weighed to four significant digits and placed in the dust tower (see FIG. 1). The vacuum was turned on and the air speed was adjusted to 8.2 to 8.3 mph, while monitoring flow via air flow meter 14. Air was drawn into the tower through air inlet 15 up past a series of perforated plates 13 spanning the inside of the tower. The sample was poured slowly and evenly through the inlet 11 on top of the tower 10 and allowed to fall down past perforated plates 13. The sides of the tower were gently tapped to loosen any trapped particles. The vacuum was then shut off, plug 16 was removed and the sample was emptied into a beaker at the bottom of the tower. This constituted one cycle for a sample. The same sample is poured through the tower five more times (as described above), for a total of six cycles, to make up one run. At the end of a run, the dust filter was re-weighed and the dust content recorded. The control and the samples with the different coating agents were run in triplicate. The control material was taken from the same lot as the material used to prepare the corresponding coated samples. The dust content of the coated samples is reported as a percent reduction compared to the dust content of the untreated control.

Example 2

Comparison of Phospholipid vs. Petroleum Coating Agents

Using a sample splitter, a sufficient amount of granular trisuperphosphates (GTSP) was divided to give a number of samples of 200 g/beaker. Each beaker with 200 g of GTSP was placed in a 60° C. oven and heated for 30 minutes. Then, 0.4 g (2000 ppm) of the anti-dusting agent (preheated to 60° C.) was added to the warm 200 g of GTSP. The sample was mixed by a roller mill for 5 minutes. The untreated control GTSP was also heated in the 60° C. oven, but no coating agent was added. The samples were tested by passing them through the dust tower as described above.

The granular trisuperphosphate (0-46-0) was obtained from Cargill Fertilizer in Tampa, Fla., and tested with three coating agents. Table 1 shows the results of the GTSP (three different lots) coated with either PLCA-1 or one of two commercial petroleum-based dust reduction coatings, HiTech DCA-100, and ArrMaz 3670. The PLCA-1 formulation contained 93 wt. % commercial lecithin (TOPCITHIN PL/UB, Lucas Meyer, Decatur, Ill.; 69 wt. % phospholipid/ acid value 21, moisture content 0.4 wt. %) and 7 wt. % soybean fatty acid methyl ester ("FAME"). The PLCA-1 treatment reduced the dust by 90%, comparable to the results obtained with the two petroleum based coating agents. The PLCA-1 also exhibited an easier handleability than the petroleum-based coating agents. The petroleum based coating agents needed to be heated >60° C. to be pliable enough for application to the GTSP. The PLCA-1 thus exhibited more desirable handling properties and functioned as well or better than the petroleum-based coating agents with respect to dust control.

Example 3

Phospholipid Coating Agent Viscosity as a Function of FAME Content

The viscosity of commercial lecithin is typically too high to allow uniform coating of fertilizer particles using conventional mixing equipment. Commonly, coating composition having a viscosity of about 4000 cP at 25° C. and 1500 cP at 40° C. are desired as coating agents for spray coating phosphate fertilizers.

Table 2 shows the viscosity of a number of lecithin/FAME formulations as a function of temperature. The PLCA-5 formulation had approximately 12 wt. % FAME (soybean fatty acid methyl ester) and viscosities of 1290 cP and 705 cP at 25° C. and 40° C., respectively. This material is too fluid for the typical equipment used to spray coat phosphate fertilizers. The viscosity of the PLCA-5 formulation is quite suitable, however, for use in coating potash fertilizers. As expected, reduction of the FAME concentration resulted in increase in the viscosity of the coating agent. The formulation with 6.6 wt. % FAME had a viscosity closest to the desired values of 1500 cP at 40° C. and 4000 cP at 25° C.

Example 4

Viscosity of Darkened Phospholipid Coating Agents

The Rice Hull Ash ("RHA"; obtained from Cargill Rice Milling, Greenville, Miss.) provides an inexpensive method of producing a dark colored fertilizer. RHA composition has approximately 50–75% silica and 25–50% carbon. A portion of the RHA was caustic treated, removing much of the silica to give a material containing 92% carbon ("RHA-C"). Addition of either RHA or RHA-C to a phospholipic-based coating (PLCA-1) blackened the coating agent. Upon application to granular GTSP, the RHA-C colored fertilizer darker than the RHA. The RHA weight percentage was increased to 12% and this concentration gave a darker brown colored GTSP, comparable to that of conventional GTSP coated with a petroleum-based formulation. The higher carbon content of the RHA-C allowed the attainment of the desired dark color. Use of the RHA with its higher silica content tended to lighten the coloring strength of the coating agent.

Figure 3:
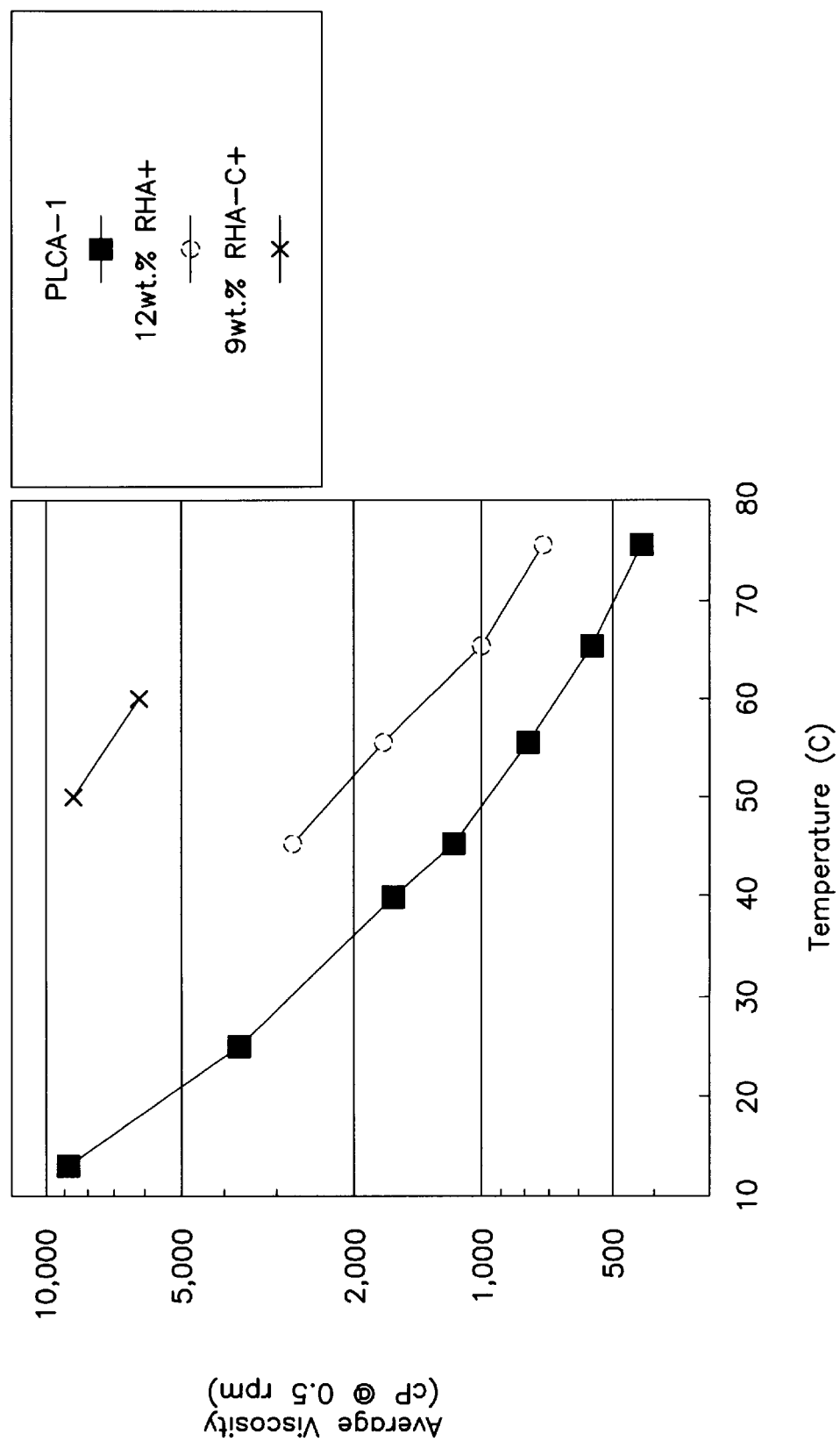
FIG. 3 is a graph showing the effect of temperature on the viscosity of two phospholipid-containing compositions of the present invention. The compositions include either rice hull ash ("RHA") or carbon enriched rice hull ash ("RHA-C") as a coloring agent.
Figure 4:
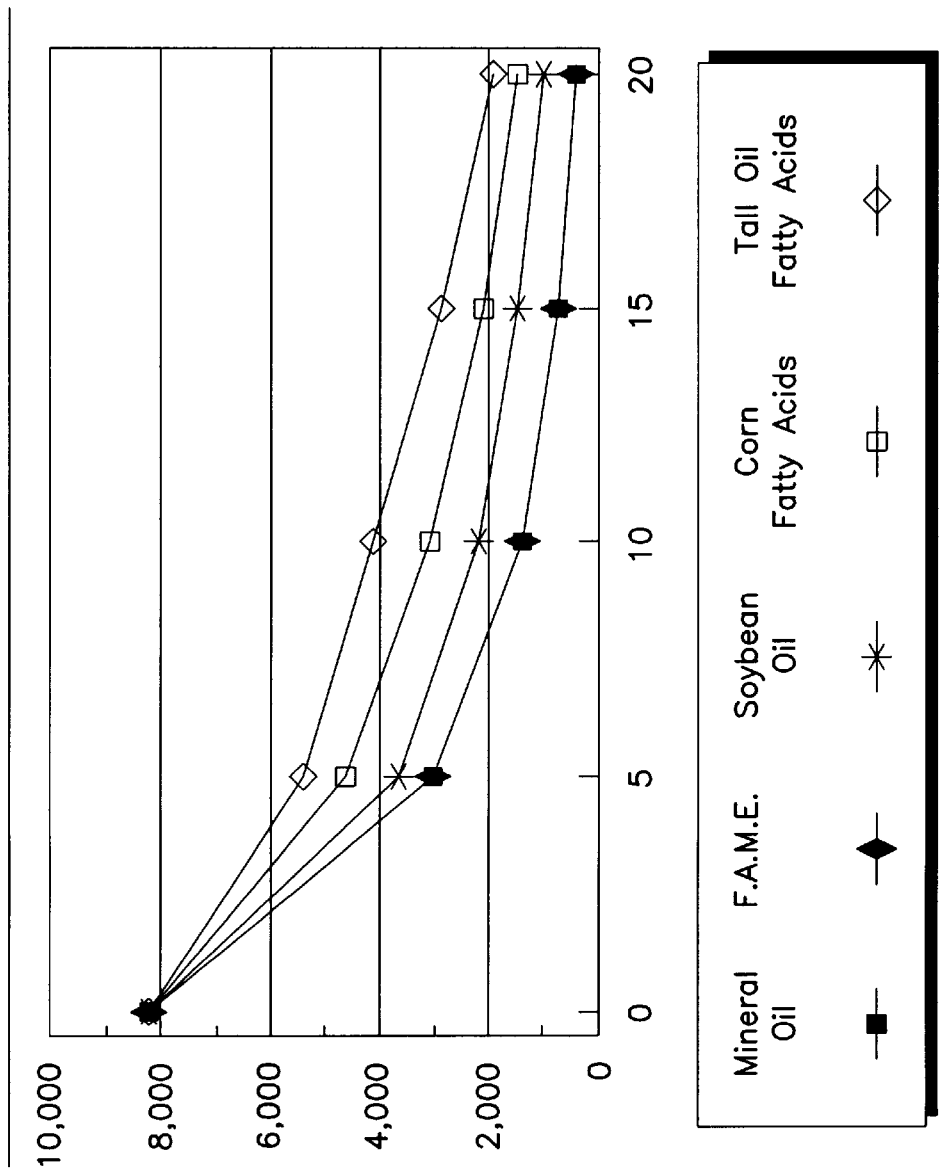
FIG. 4 is a graph showing the effect on viscosity (at 25° C.) of inclusion of a number of lipophilic diluents in a composition of the present invention containing a commercial fluidized soybean lecithin.
Figure 5:
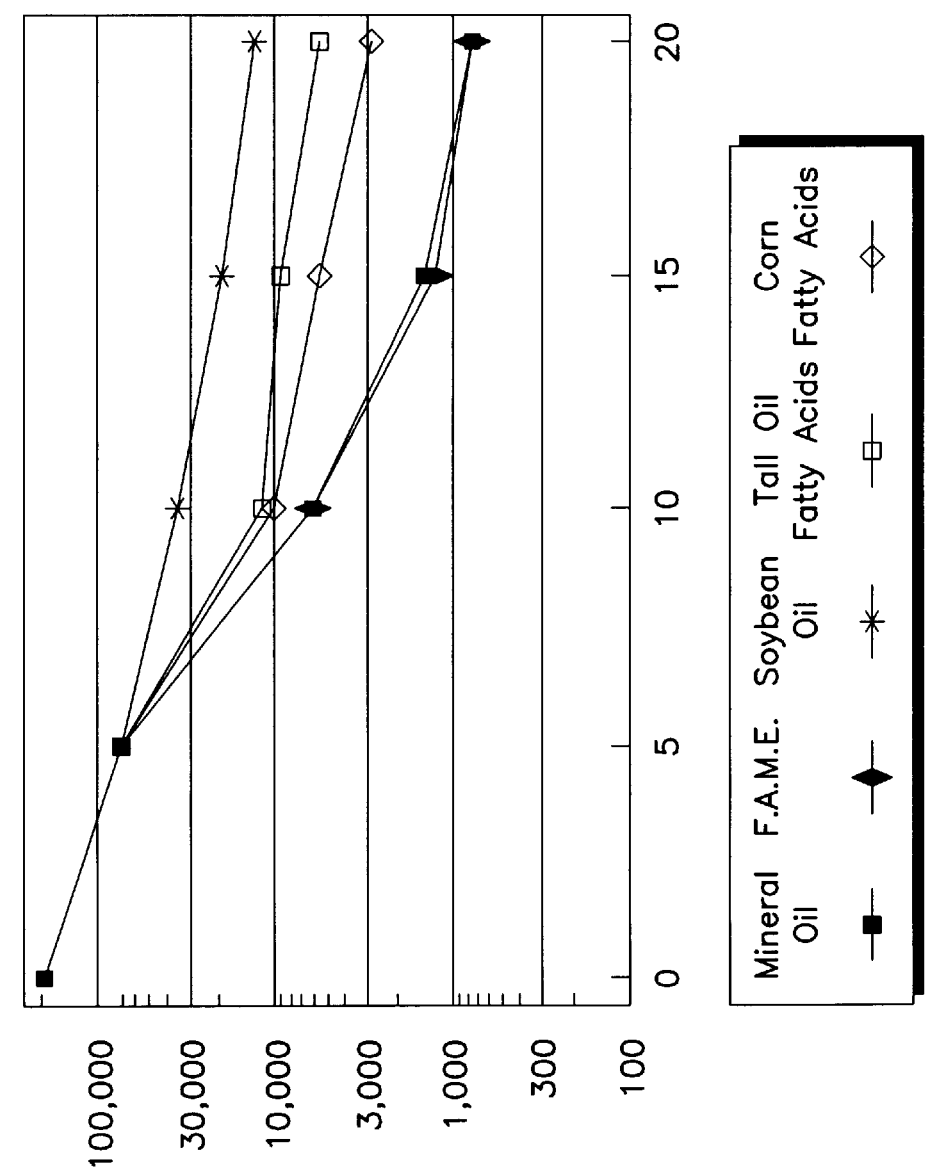
FIG. 5 is a graph showing the effect on viscosity (at 25° C.) of inclusion of a variety of lipophilic diluents in a composition of the present invention that contains a crude soybean lecithin.

Addition of the RHA-C to the phospholipid coating composition increased the viscosity of the coating agent resulting in a paste. The viscosity of the RHA-C coating agent was similar to the that observed with commercial petroleum-based products (FIG. 3). This poses a spraying problem with conventional equipment. Increasing the FAME concentration in the RHA-C containing coating agent (9.0 wt. %) did not improve the viscosity problem. FIG. 3 shows the viscosity of an RHA-containing coating agent with 12% FAME compared to the RHA-C based coating agent. The RHA-based coating agent had much improved viscosity with a value near the desired viscosity (1500 cP at 40° C. and 4000 cP at 25° C.), wherein the RHA-containing formulation is not a paste, thereby permitting easier application. The RHA did tend to settle to the bottom of the container if the formulation was allowed to stand for ~4 hours. Consequently, constant agitation was necessary to keep the RHA well mixed in the coating agent.

Example 5

Dust Reduction with Rice Hull Ash Containing Phospholipid Coating Agents

Table 3 shows the dust content of RHA-C and RHA containing coating agent in dust tower experiments. The RHA and RHA-C containing coating agents reduced dust (~90%) comparable to the uncolored coating agent.

A 7.0 wt. % FAME concentration in crude lecithin gave a comparable anti-dusting agent to the petroleum-based coated fertilizer. The addition of RHA-C, at 9.0 wt. % in the coating agent, blackened the fertilizer (4000 ppm) to an uniformly, intense black color, matching the color of the commercial fertilizers coated with a petroleum-based agent. The addition of RHA, 12.0 wt. % in the coating agent, gave a lighter brown colored fertilizer, but comparable to the fertilizers coated iwth a petroleum-based formulation. The addition of neither RHA nor RHA-C caused any dust problems. Since the RHA-C requires further processing to get the purer carbon ash cost and the comparable coloring achieved with RHA, additives of RHA-coating formulations appears to provide economical means of coloring the phospholipid based coating agents.

Example 6

Dust Reduction of DAP Coated with Phospholipid/ Diluent Combinations

Figure 6:
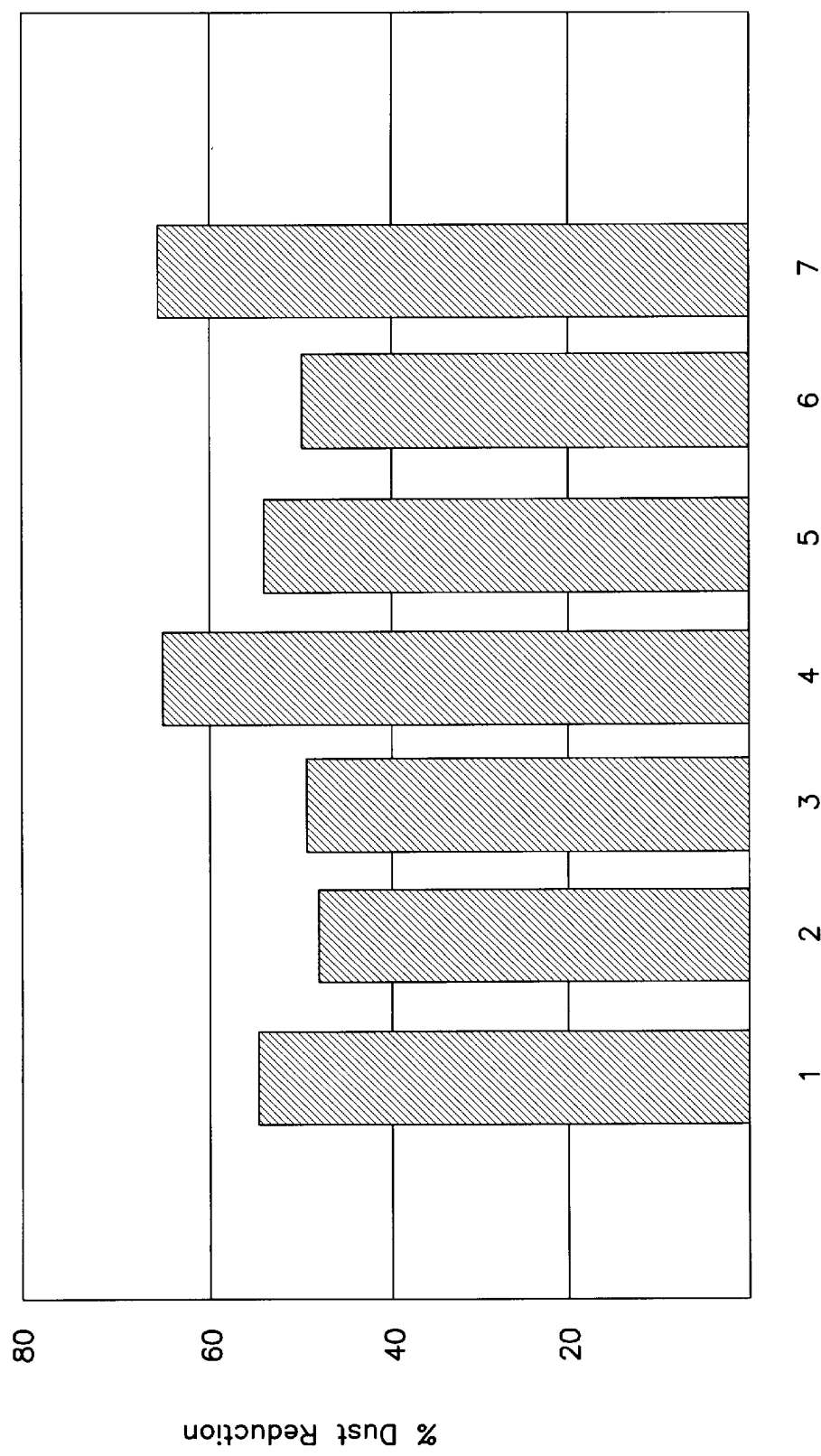
FIG. 6 is a bar graph showing the amount of dust reduction attained (relative to uncoated material) by coating granular diammonium phosphate ("DAP") with a number of phospholipid-containing compositions according to the present invention (#3—fluidized soapstock; #4—fluidized lecithin; #5—lecithin with 10 wt. % mineral oil; #6—lecithin with 10 wt. % soybean oil; and #7—lecithin with 10 wt. % soybean fatty acid methyl ester). The results obtained with two commercial coating agents, a petroleum-based coating (#1; ArrMaz 3670™) and a hydrogenated mineral oil (#2; Paraflex HT-100™), are shown for comparison purposes.

FIG. 6 shows the results of a determination of the dust content of DAP samples coated with phospholipid-based coating agents containing a variety of lipophilic diluents. The DAP samples were coated with 0.2 wt. % of the coating agents. The best results (>60% dust reduction) were obtained with a commercial fluidized lecithin (#4) and lecithin containing 10 wt. % FAME (#7; PLCA-11). For comparison purposes, DAP samples coated with a commercial petroleum-based coating (#1; Arr-Maz 3670; 55% dust reduction) and a hydrogenated mineral oil (#2; 50% dust reduction) were included in the study. Dust reduction comparable to that observed with the commercial coating agents was obtained with lecithin containing 10 wt. % mineral oil (#5; PLCA-9; 55% dust reduction), lecithin containing 10 wt. % soybean oil (#6; PLCA-10; 50% dust reduction) and a fluidized soapstock (#4; 50% dust reduction).

Example 7

Preparation of Maleinized Lecithin

Maleinized Lecithin and its neutralized salt were prepared using the following methods. Soybean lecithin (25 g) was added to a 100 mL 2-neck flask equipped with a nitrogen inlet, magnetic stir-bar, and temperature probe. After the addition of iodine (0.05 g, 0.02 wt %), the flask was heated to 120° C. under a slight vacuum to remove any water. Iodine acts as a catalyst to conjugate the double bonds. Once the temperature has been reached (120° C.), 0.62 g (2.5 wt %) maleic anhydride was added. The temperature was kept between 120 and 140° C. for 4 hours. After cooling to room temperature, the final product, a dark liquid with a viscosity lower than lecithin was obtained.

Neutralized Maleinized Lecithin was prepared by mixing the following components (in the order shown) in a beaker at room temperature:

78.5% Maleinized Lecithin
6.1% Ammonium Hydroxide
15.4% Distilled Water

Example 8

Preparation of Maleinized Soapstock

Maleinized Soap Stock and its neutralized salt were prepared using the following methods. Soapstock (40 g; obtained from a Cargill Oilseeds Processing Plant (Wichita, Kans.)) was placed into a 250 mL 2 neck flask equipped with a nitrogen inlet and mechanical stirrer (metal stirring rod inserted through a 24/40 septum). After adding iodine (0.08 g, 0.02 wt %), the flask was heated to 100 C under slight vacuum for 30 minutes. The temperature was checked by replacing the nitrogen inlet with a temperature probed inserted through a 24/40 septum. After 30 minutes of heating, 1 g of maleic anhydride (2.5 wt %) was added, and the reaction was heated for another 1.5 hours at 105 to 110 C. The final product was a dark red liquid (when warm) but cooled to a viscous liquid.

Example 9

Dust Control of MAP, DAP, GSTP and Potash Using Phospholipid Coating Agents

In addition to materials described in the preceding examples, Paraflex HT-100, Dustrol 3079, and soybean oil tank bottoms were employed in one or more of the dust control experiments reported in Tables 4–9. Dustrol 3079 was obtained from Arr-Maz Products, Winter Haven, Fla. (813) 293–7884. Dustrol 3079 is designed to suppress dust when applied to granular fertilizer products such as MAP, DAP, and GTSP. Dustrol 3079 controls dust by coating fertilizer particles with a thin film of a petroleum-based material. Typical properties of Dustrol 3079 are shown in Table 10 below.

TABLE 10

| TYPICAL PROPERTIES OF DUSTROL 3079 | |
|---|---|
| Specific Gravity (180° F.) | 0.95 to 0.98 |
| Viscosity @ 180° F. (82° C.) | 650 to 750 cps |
| Flash Point (PMCC) | >300° F. |
| Color | Dark brown to black |

Paraflex HT-100 obtained from Petro-Canada Inc., Calgary, Alberta, is commonly applied as a coating to control dust associated with potash. Paraflex HT-100 is severely hydrogenated and very low in aromatic hydrocarbons. Typical properties of Paraflex HT-100 are shown in Table 11 below.

TABLE 11

TYPICAL PROPERTIES OF PALLLLEX HT-100

| | |
|---|---|
| Density (15° C.) | 0.9 kg/L |
| Pour Point | −30 to −12° C. |
| Boiling Point (@ 1 atm) | >315° C. |
| Appearance | Colorless, viscous liquid |

The tank bottoms were obtained from a Cargill Oilseed Processing Plant (Chesapeake, Va.). The composition of the tank-bottoms was very similar to lecithin. The tank bottoms had a moisture content of 6.1 wt. %.

The following method describes a general procedure adopted for fertilizer coating. Using a splitter, each material was divided into a number of 200 g samples. Each sample was heated to 60° C. The desired concentration (or amount) of treatment (anti-dusting agent) was added to the fertilizer samples which had been heated at 60° C. for 30 minutes (except for the control). The treated samples were mixed in glass jars on a mechanical roller mixer for 5 minutes. The determination of the dust content of the samples was then determined as described in Example 1.

Example 10

Dust Reduction of Coated Potash Particles

Figure 7:
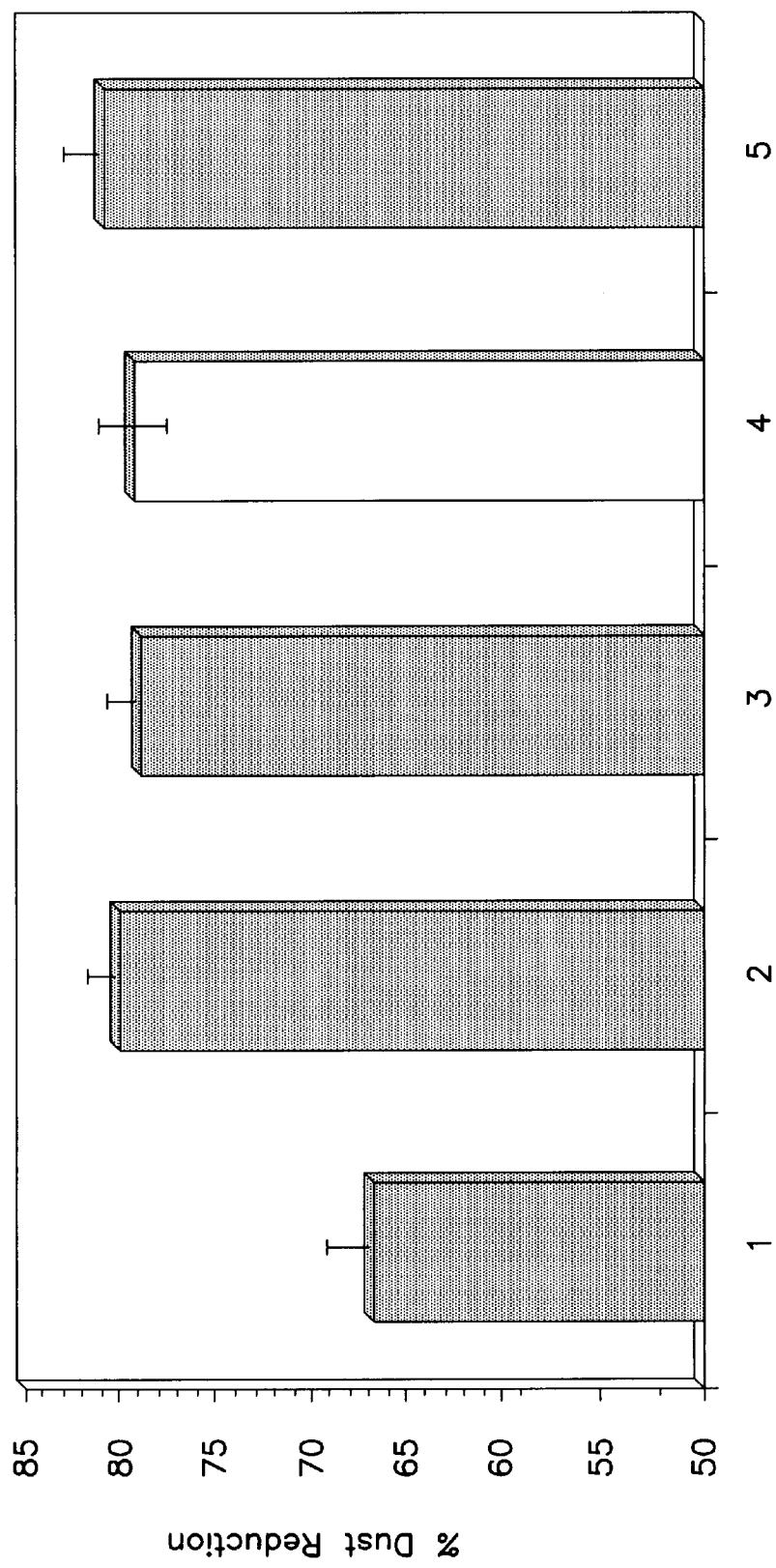
FIG. 7 is a bar graph showing the amount of dust reduction attained (relative to uncoated material) by coating granular potash (KCl) with a number of phospholipid-containing compositions according to the present invention (#2—crude lecithin with 15 wt. % FAME; #3—crude lecithin with 15 wt. % mineral oil; #4—unbleached lecithin with 15 wt. % FAME; #3—unbleached lecithin with 15 wt. % mineral oil). The result obtained with a commercial hydrogenated mineral oil coating agent (#1; Paraflex HT-100™) is shown for comparison purposes.

The relative effectiveness of a number of the present phospholipid-based coating agents in reducing the dust associated with a potash fertilizer is shown in FIG. 7. The results were compared with those obtained with a commercial hydrogenated mineral oil coating agent (#1; Paraflex HT-100™). All of the coating agents were applied to the potash particles at a 2000 ppm coating weight. The four phospholipid-based coating agents (#2—crude lecithin with 15 wt. % FAME; #3—crude lecithin with 15 wt. % mineral oil; #4—unbleached lecithin with 15 wt. % FAME; #5—unbleached lecithin with 15 wt. % mineral oil) showed substantially better dust control (circa 80%) than that observed with the commercial mineral oil coating agent commonly used with potash (67%). A statistical analysis of the results from 15 individual test runs showed 66.8±2.67% dust reduction with the mineral oil versus 80.1±1.64% dust reduction with the lecithin/15wt. % FAME coating agent.

The invention has been described with reference to various specific and preferred embodiments and techniques. The invention is not to be construed, however, as limited to the specific embodiments disclosed in the specification. It should be understood that many variations and modifications may be made while remaining within the spirit and scope of the invention.

TABLE 1

THE COMPARISON OF DUST CONTROL OF GTSP SAMPLES COATED WITH PLCA-1 AND PETROLEUM-BASED FORMULATIONS

| Sample | Dust Collected (g) | Std. Dev. | % Reduction |
|---|---|---|---|
| Control (lot #1) | 0.0215 | 0.0039 | — |
| PLCA-1 (lot #1) | 0.0013 | 0.0010 | 93.80 |
| ArrMaz (lot #1) | 0.0023 | 0.0011 | 89.15 |
| Hitech (lot #1) | 0.0089 | 0.0026 | 58.45 |
| Control (lot #2) | 0.0211 | 0.0025 | — |
| PLCA-1 (lot #2) | 0.0007 | 0.0001 | 96.68 |
| ArrMaz (lot #2) | 0.0009 | 0.0005 | 95.89 |
| Hitech (lot #2) | 0.0007 | 0.0007 | 96.68 |
| Control (lot #3) | 0.0363 | 0.0040 | — |
| PLCA-1 (lot #3) | 0.0012 | 0.0003 | 96.61 |
| ArrMaz (lot #3) | 0.0002 | 0.0001 | 99.54 |
| Hitech (lot #3) | 0.0020 | 0.0007 | 94.59 |

TABLE 2

THE EFFECT OF FAME CONCENTRATION ON PHOSPHOLIPID COATING AGENT VISCOSITY AT VARIOUS TEMPERATURES

| Concentration of FAME (wt. %) | Temperature (°C.) | Average Viscosity (cP @ 0.5 rpm) |
|---|---|---|
| 0.0 (Lecithin) | 45.0 | 4,347 |
| | 60.1 | 1,989 |
| | 75.1 | 1,119 |
| 5.0 (PLCA-2) | 25.1 | 5,454 |
| | 40.0 | 2,193 |
| | 45.2 | 1,692 |
| 6.6 (PLCA-3) | 13.3 | 8,895 |
| | 25.1 | 3,666 |
| | 40.0 | 1,614 |
| | 45.1 | 1,344 |
| 9.0 (PLCA-4) | 24.9 | 2,535 |
| | 39.9 | 1,200 |
| | 45.1 | 963 |
| 12.0 (PLCA-5) | 10.0 | 2,988 |
| | 25.0 | 1,290 |
| | 40.2 | 705 |
| | 45.0 | 630 |
| 14.9 (PLCA-6) | 10.0 | 2,460 |
| | 24.9 | 1,032 |
| | 40.0 | 642 |
| | 45.1 | 582 |

TABLE 3

DUST CONTENT OF GTSP COATED WITH PHOSPHOLIPID COATING AGENT WITH AND WITHOUT RICE HULL ASH OR RICE HULL ASH CARBON

| | Sample | Dust Collected (g) | Std. Dev. | % Reduction |
|---|---|---|---|---|
| | Control | 0.0126 | 0.0021 | — |
| PLCA-1 | Coating Agent (7% FAME) | 0.0010 | 0.0007 | 91.8 |
| PLCA-7 | 9.0 wt. % RHA-C in Coating Agent (7% FAME) | 0.0014 | 0.0014 | 89.2 |
| | Control | 0.0102 | 0.0032 | — |
| PLCA-8 | 12.0 wt. % RHA in Coating Agent (7% FAME) | 0.0009 | 0.0006 | 90.8 |

TABLE 4

FERTILIZER - DAP

| Treatment | Concentration | Dust Collected (g) | % Reduction |
|---|---|---|---|
| Untreated | 0 | 0.0593 | 0 |
| Soapstock | 4000 ppm | 0.0387 | 34.7 |

TABLE 4-continued

FERTILIZER - DAP

| Treatment | Concentration | Dust Collected (g) | % Reduction |
|---|---|---|---|
| Dustrol 3079 | 2000 ppm | 0.0318 | 46.4 |
| Paraflex HT-100 | 2000 ppm | 0.0309 | 47.9 |
| Maleinized Soapstock | 2000 ppm | 0.0491 | 17.2 |
| Maleinized Lecithin | 2000 ppm | 0.037 | 37.6 |
| Neutralized Maleinized Lecithin | 2000 ppm | 0.0414 | 30.2 |

TABLE 5

FERTILIZER - DAP

| Treatment | Concentration | Dust Collected (g) | % Reduction |
|---|---|---|---|
| Untreated | 0 | 0.0272 | 0 |
| Tank-Bottoms | 2000 ppm | 0.0169 | 37.9 |

TABLE 6

FERTILIZER - POTASH

| Treatment | Concentration | Dust Collected (g) | % Reduction |
|---|---|---|---|
| Untreated | 0 | 0.0797 | 0 |
| Dustrol 3079 | 2000 ppm | 0.0366 | 54.08 |
| Paraflex HT-100 | 2000 ppm | 0.0365 | 54.2 |
| Maleinized Lecithin | 2000 ppm | 0.0212 | 73.4 |
| Tank-Bottoms | 2000 ppm | 0.017 | 97.9 |

TABLE 7

FERTILIZER - DAP

| Treatment | Concentration | Dust Collected (g) | % Reduction |
|---|---|---|---|
| Untreated | 0 | 0.0357 | 0 |
| Dustrol 3079 | 2000 ppm | 0.0339 | 5.1 |
| Paraflex HT-1OG | 2000 ppm | 0.0358 | -0.3 |
| Maleinized Lecithin | 2000 ppm | 0.0348 | 2.5 |
| Tank-Bottoms | 2000 ppm | 0.029 | 18.8 |

TABLE 8

FERTILIZER - MAP

| Treatment | Concentration | Dust Collected (g) | % Reduction |
|---|---|---|---|
| Untreated | 0 | 0.3465 | 0 |
| Dustrol 3079 | 2000 ppm | 0.2379 | 31.3 |
| Paraflex HT-100 | 2000 ppm | 0.3245 | 6.4 |
| Soapstock | 2000 ppm | 0.3316 | 4.3 |
| Tank-Bottoms | 2000 ppm | 0.2679 | 22.7 |

TABLE 9

FERTILIZER - GTSP

| Treatment | Concentration | Dust Collected (g) | % Reduction |
|---|---|---|---|
| Untreated | 0 | 0.1035 | 0 |
| Dustrol 3079 | 2000 ppm | 0.0659 | 36.3 |

TABLE 9-continued

FERTILIZER - GTSP

| Treatment | Concentration | Dust Collected (g) | % Reduction |
|---|---|---|---|
| Paraflex HT-100 | 2000 ppm | 0.0794 | 23.3 |
| Soapstock | 2000 ppm | 0.0873 | 15.7 |
| Tank-Bottoms | 2000 ppm | 0.0625 | 39.6 |

What is claimed is:

1. A coated granular substance comprising:
   inorganic particles having outer surfaces at least partially coated with an organic layer;
   wherein the organic layer includes (i) a phosphorus-containing, amphiphilic component and (ii) lipophilic diluent including fatty acid lower alkyl ester, mineral oil or a mixture thereof; and at least about 90% of the inorganic particles have a particle size of 1 mm to about 6 mm.

2. The coated granular substance of claim 1 wherein the inorganic particles include fertilizer particles.

3. The coated granular substance of claim 2 wherein the fertilizer particles are selected from the group consisting of phosphate salts, potassium salts, nitrate salts and mixtures thereof.

4. The coated granular substance of claim 1 wherein the phosphorus-containing, amphiphilic component includes a lecithin-derived phospholipid.

5. The coated granular substance of claim 4 wherein the lecithin-derived phospholipid is a soybean, corn, coconut, cannola, sunflower, cotton seed, palm, palm kernel, a peanut or linseed lecithin, or a mixture thereof.

6. The coated granular substance of claim 4 wherein the lecithin-derived phospholipid includes one or more compounds selected from the group consisting of phosphatidylcholines, phosphatidylethanolamines, phosphatidylserines, phosphatidylglycerols, phosphatidylinositols, phosphatidic acids, and N-acyl phophatidyl amines.

7. The coated granular substance of claim 1 wherein the organic layer comprises at least about 0.01 wt. %, based on total coated particle weight, of the phosphorus-containing, amphiphilic component.

8. The coated granular substance of claim 1 wherein the organic layer comprises no more than about 1.0 wt. %, based on total coated particle weight, of the phosphorus-containing, amphiphilic component.

9. The coated granular substance of claim 1 wherein the organic layer further comprises a coloring agent.

10. The coated granular substance of claim 1 wherein the fatty acid lower alkyl ester includes C1–C4 alkyl ester of C14–C18 fatty acid.

11. The coated granular substance of claim 1 wherein the lipophilic diluent further comprises diluent selected from the group consisting of vegetable oil, fatty acid, fatty acid amide, fatty alcohol and mixtures thereof.

12. The coated granular substance of claim 1 wherein the coating layer includes at least about 50 wt. % phospholipid; about 0.01 to about 3 wt. % water; and about 3 to about 40 wt. % of the lipophilic diluent.

13. The coated granular substance of claim 1 wherein the lipophilic diluent includes about 5 to about 20 wt. % fatty acid methyl ester, based on the total weight of the coating layer.

14. A method of producing inorganic particles at least partially coated with an organic layer, said method including:

applying a coating composition to the inorganic particles;

wherein the coating composition includes (i) a phosphorus-containing amphiphilic component and (ii) lipophilic diluent including fatty acid lower alkyl ester, mineral oil or a mixture thereof; and at least about 90% of the inorganic particles have a particle size of 1 mm to about 6 mm.

15. The method of claim 14 wherein the coating composition has a viscosity of about 100 to about 10,000 cP at 25° C.

16. The method of claim 14 wherein the fatty acid lower alkyl ester includes C1–C4 alkyl ester of C14–C18 fatty acid.

17. The method of claim 14 wherein the lipophilic diluent further comprises a diluent selected from the group consisting of vegetable oil, fatty acid, fatty acid amide, fatty alcohol and mixtures thereof.

18. A method of reducing dust associated with fertilizer particles, said method including:

applying a dust reduction composition to the fertilizer particles;

wherein the dust reduction composition includes (i) a phosphorus-containing amphiphilic component and (ii) lipophilic diluent including fatty acid lower alkyl ester, mineral oil or a mixture thereof; and at least about 90% of the inorganic particles have a particle size of 1 mm to about 6 mm.

19. The method of claim 18 wherein the dust reduction composition comprises at least about 25 wt. % of a phospholipid; about 0.01 to about 10 wt. % water; and about 3 to about 40 wt. % of a lipophilic diluent.

20. The method of claim 18 comprising applying no more than about 0.5 wt. %, based on the weight of the fertilizer particles, of the dust reduction composition to the fertilizer particles.

21. The method of claim 18 further comprising heating the dust reduction composition applied to the fertilizer particles at a sufficient temperature for a sufficient time to darken the coated fertilizer particles.

22. The method of claim 18 wherein the applying step comprises spraying the dust reduction composition onto potash fertilizer particles; and the dust reduction composition has a Brookfield viscosity of about 500 to about 800 cP at 40° C.

23. The method of claim 18 wherein the applying step comprises spraying the dust reduction composition onto phosphate fertilizer particles; and the dust reduction composition has a Brookfield viscosity of about 1000 to about 6,000 cP at 25° C.

24. The method of claim 18 comprising applying a sufficient amount of the dust reduction composition to the fertilizer particles to reduce the dust content by at least about 50% with respect to uncoated particles.

25. A fertilizer spreader containing fertilizer particles, said fertilizer particles having outer surfaces at least partially coated with an organic layer;

wherein the organic layer includes (i) a phosphorus-containing, amphiphilic component and (ii) lipophilic diluent including fatty acid lower alkyl ester, mineral oil or a mixture thereof; and at least about 90% of the inorganic particles have a particle size of 1 mm to about 6 mm.

26. A fertilizer composition formed by a process comprising applying a coating composition to fertilizer particles, wherein the coating composition includes (i) a phosphorus-containing amphiphilic component and (ii) lipophilic diluent including fatty acid lower alkyl ester, mineral oil or a mixture thereof; and at least about 90% of the inorganic particles have a particle size of 1 mm to about 6 mm.

* * * * *